United States Patent
König

(10) Patent No.: US 8,833,339 B2
(45) Date of Patent: Sep. 16, 2014

(54) RECIPROCATING PISTON ENGINE WITH IMPROVED MASS EQUALIZATION

(76) Inventor: Harald König, Fuschl am See (AT)

(*) Notice: Subject to any disclaimer, the term of this patent is extended or adjusted under 35 U.S.C. 154(b) by 172 days.

(21) Appl. No.: 13/640,973

(22) PCT Filed: Apr. 8, 2011

(86) PCT No.: PCT/AT2011/000170
§ 371 (c)(1),
(2), (4) Date: Dec. 17, 2012

(87) PCT Pub. No.: WO2011/127502
PCT Pub. Date: Oct. 20, 2011

(65) Prior Publication Data
US 2013/0087120 A1    Apr. 11, 2013

(30) Foreign Application Priority Data

Apr. 12, 2010 (AT) ................................ A 585/2010
Jul. 2, 2010 (AT) ................................ A 1127/2010

(51) Int. Cl.
| F02B 75/02 | (2006.01) |
| F02B 75/32 | (2006.01) |
| F01B 3/00 | (2006.01) |
| F01B 9/04 | (2006.01) |
| F16F 15/24 | (2006.01) |
| F02B 75/18 | (2006.01) |
| F02B 75/06 | (2006.01) |

(52) U.S. Cl.
CPC .............. *F02B 75/1896* (2013.01); *F02B 75/32* (2013.01); *F01B 3/0005* (2013.01); *F01B 9/042* (2013.01); *F16F 15/24* (2013.01); *F02B 75/06* (2013.01); *F02B 2075/1812* (2013.01)
USPC ........ 123/311; 123/56.1; 123/56.2; 123/56.3; 123/56.4; 123/56.5; 123/56.6; 123/56.7; 123/56.8; 123/56.9

(58) Field of Classification Search
USPC .......................................... 123/311, 56.1–56.9
See application file for complete search history.

(56) References Cited

U.S. PATENT DOCUMENTS 2,065,790 A   12/1936  Braunwalder
3,945,359 A   3/1976   Asaga
(Continued)

FOREIGN PATENT DOCUMENTS

FR           416.890        10/1910

OTHER PUBLICATIONS

European Patent Office, International Search Report in connection with corresponding PCT Application No. PCT/AT2011/000170, dated Oct. 19, 2011, 4 pages.
European Patent Office, Written Opinion in connection with corresponding PCT Application No. 2011/AT2011/000170, dated Nov. 19, 2011, 5 pages.

(Continued)

*Primary Examiner* — Marguerite McMahon
*Assistant Examiner* — James Kim
(74) *Attorney, Agent, or Firm* — Kolisch Hartwell, P.C.

(57) ABSTRACT

The disclosure relates to reciprocating piston engines having four cylinders with a circular cross section, cylinder axes which are parallel to one another, and an output shaft. The cylinder axes, as viewed in axial section, lie at the corner points of a rectangle that is a square, with the output shaft, which extends parallel to the cylinder axes, in the center of the square. Each pair of cylinders which lie diagonally opposite one another are arranged in the same direction, as viewed axially, and in opposite directions, as viewed axially, with respect to the other pair of cylinders. The force or moment from each cylinder is transmitted to the output shaft via a dedicated rotating crank and a toothing system.

6 Claims, 5 Drawing Sheets

(56) References Cited

U.S. PATENT DOCUMENTS

Figure 1:
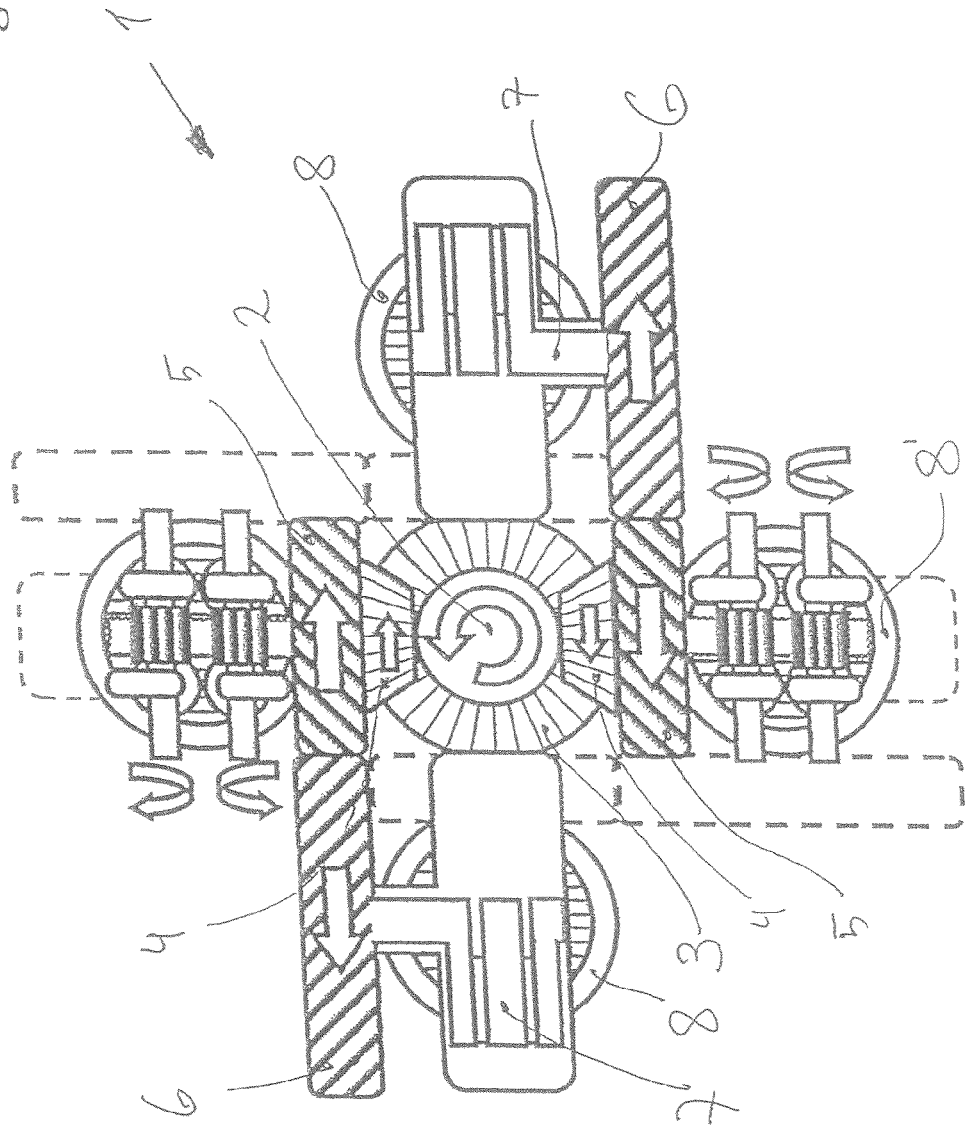

| | | | | |
|---|---|---|---|---|
| 4,850,313 | A | * | 7/1989 | Gibbons ........................ 123/54.2 |
| 4,909,206 | A | * | 3/1990 | Parsons ........................ 123/197.1 |
| 5,890,462 | A | * | 4/1999 | Bassett ........................ 123/56.2 |
| 6,213,064 | B1 | * | 4/2001 | Geung ........................ 123/54.1 |
| 7,395,789 | B2 | * | 7/2008 | Ferman ........................ 123/56.1 |
| 2007/0017460 | A1 | | 1/2007 | Ferman |
| 2010/0300401 | A1 | * | 12/2010 | Blount ........................ 123/245 |

OTHER PUBLICATIONS

Yolaine Cussac, Authorized Officer of the International Bureau of WIPO, "International Preliminary Report on Patentability" in connection with corresponding PCT Application No. PCT/AT2011/000170, dated Oct. 16 2012, 10 pages (which includes translation).

* cited by examiner

RECIPROCATING PISTON ENGINE WITH IMPROVED MASS EQUALIZATION

The invention relates to a reciprocating piston engine with improved mass equalization corresponding to the preamble of claim 1. Such an engine is known from JP 2004204777. This document discloses a device in which each piston acts on a rocker which for its part converts, via a bevel transmission and free wheels, the reciprocating movement into a continuous rotational movement of an output shaft which extends perpendicularly with respect to the cylinder axes. The mass equalization is poor, in addition to all the basic problems of reciprocating masses.

DE 26 26 979 discloses an engine with a reciprocating piston which can continue to run even when the output axial is fixed, but is then set in rotation about the output axial. Said engine has two annular cylinders which are arranged in a mirror-inverted fashion coaxially about the output axial and have annular pistons which are connected to the output axial via an internal transmission with a type of Cardan joint or differential. Even if the pistons have full mass equalization, the complex transmission (arranged in the central cavity of the cylinders) is not fully equalized, without even considering the other practical inadequacies.

Generally, reciprocating piston engines are widespread owing to their maturity and the generally available know how and the technical refinement of the materials and the extensive knowledge of the combustion processes in the cylinder and the excellent adaptation to the respective field of use which is achieved as a result.

A problem which is intrinsic in the principle of the reciprocating piston engine is the problem of mass equalization which occurs, on the one hand, as a result of the to-and-fro movement of the piston in conjunction with the non-uniform piston speed from the top dead center and from the bottom dead center, and on the other hand, as a result of the unbalance which is caused by the lateral component of the crank movement.

Series-mounted six-cylinder engines during four-stroke operation with 120° ignition interval provide complete equalization here up to the second order, both with free mass forces and with free mass torques, but in such engines the torsional rigidity or the lack of torsional rigidity of the long crankshaft already starts to become problematic, and as a result of the arrangement of the cylinders in series there are engine blocks which are of very long design.

Equalization structures operate with various eccentric shafts which run parallel to the crankshaft and are connected to it in a rotationally fixed fashion, and usually rotate with twice the rotational speed, or four times the rotational speed, of the crankshaft in order to equalize the mass forces and mass torques. In a reversal of these complex, and therefore expensive, systems, designers have on various occasions been satisfied with a means of suspending or mounting the engine which as much as possible does not transmit the vibrations to the base or to the vehicle frame.

The invention has, in contrast, the objective of providing a reciprocating piston engine which is of compact design and has high-quality equalization of the mass forces and mass torques.

According to the invention, these objectives are achieved in a reciprocating piston engine with the features specified in the characterizing part of claim 1.

In other words, the reciprocating piston engine according to the invention is substantially characterized in that its output shaft runs parallel to the cylinder axes, and also preferably by the fact that the transmission of torque to the output shaft occurs via bevel gears. The cylinders have a circular cross section.

Four cylinders are preferably arranged in a square, wherein the cylinders which lie diagonally with respect to one another operate in opposite directions, but in an otherwise equal angular position, and the two cylinder pairs which are formed in this way are arranged head to foot, that is say between the crank drives of the one pair the cylinder heads are provided with the valves of the other pair.

The transmission of the torques of the individual cylinders to the output axial by means of bevel gears is no longer a problem as a result of the possibility of fabricating with high precision and high stability, and the problems in this regard which occurred in terms of the service life and the movement accuracy of bevel gears up to the 1980s have been completely overcome, as have also the very high manufacturing costs of that time.

Figure 2:
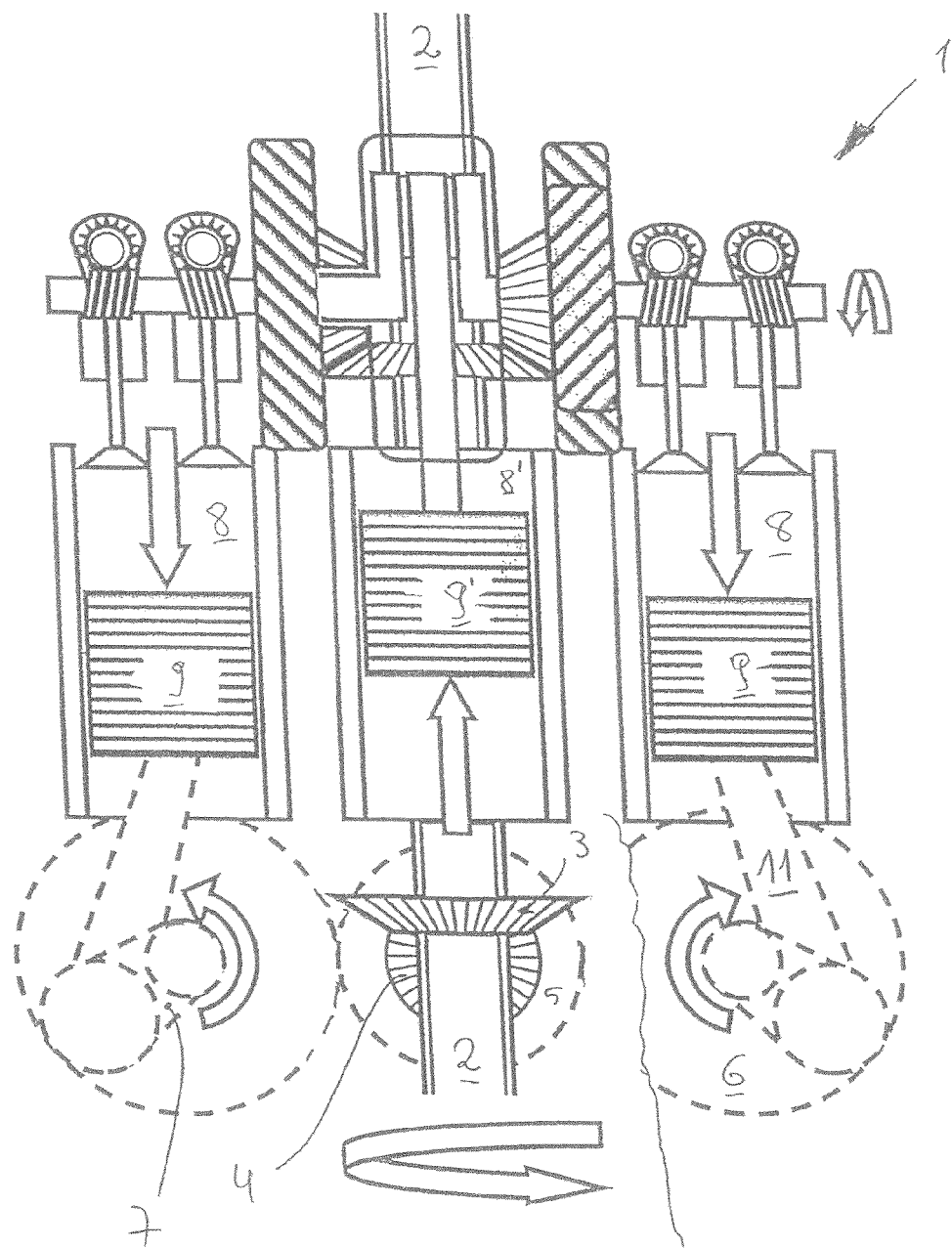
Figure 3:
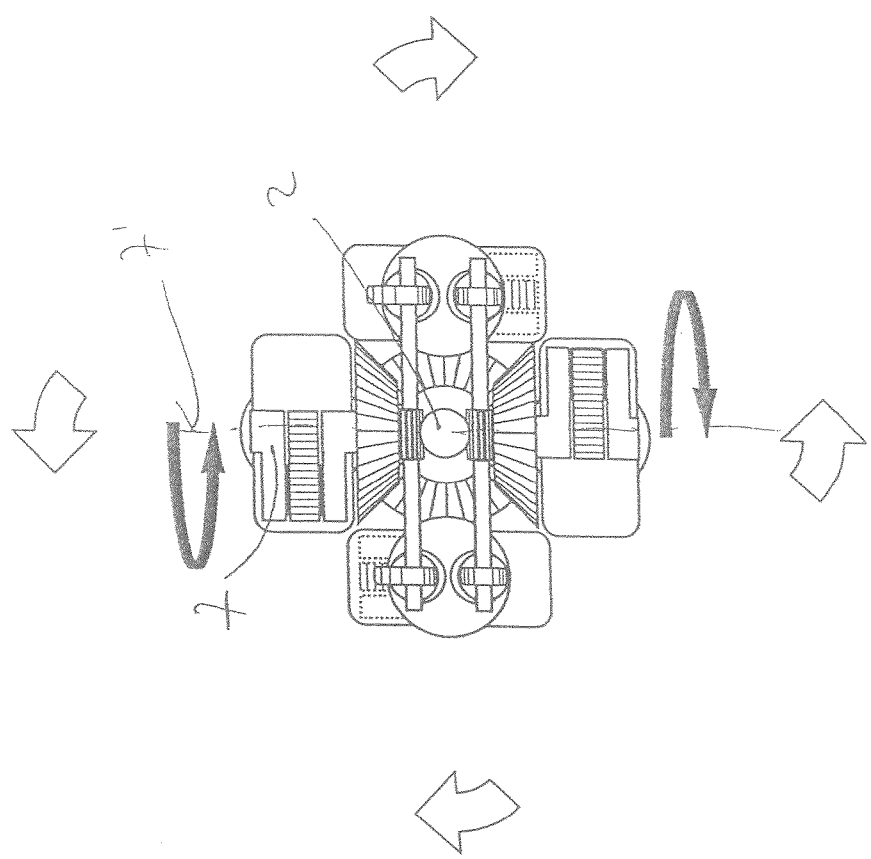
Figure 4:
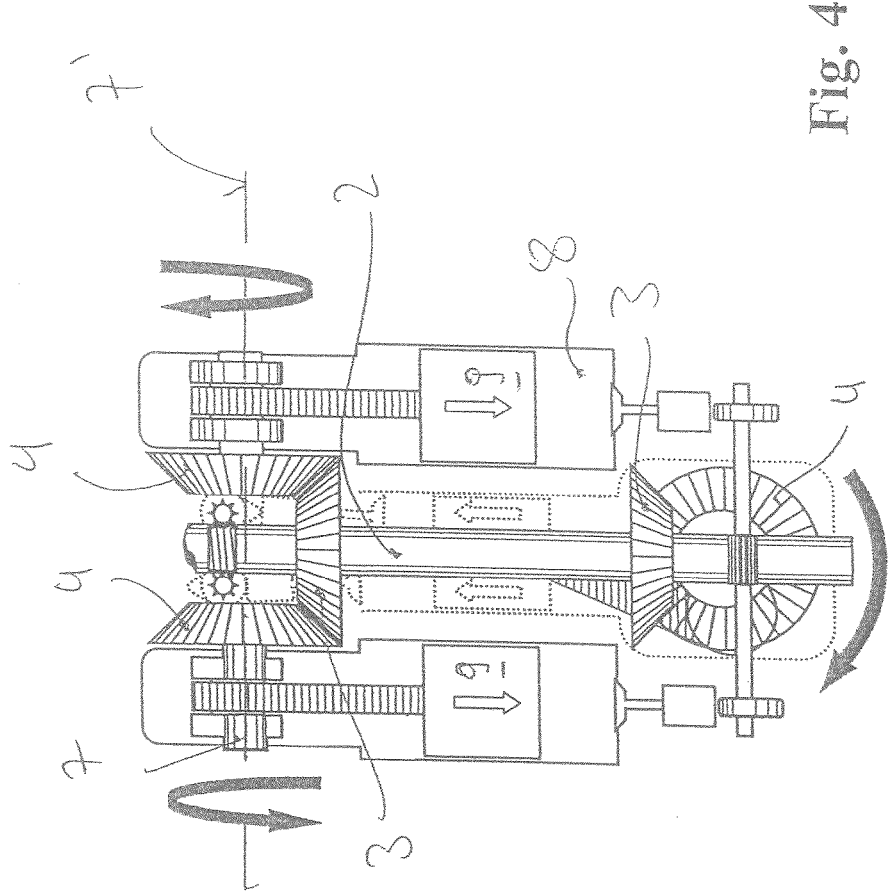
Figure 5:
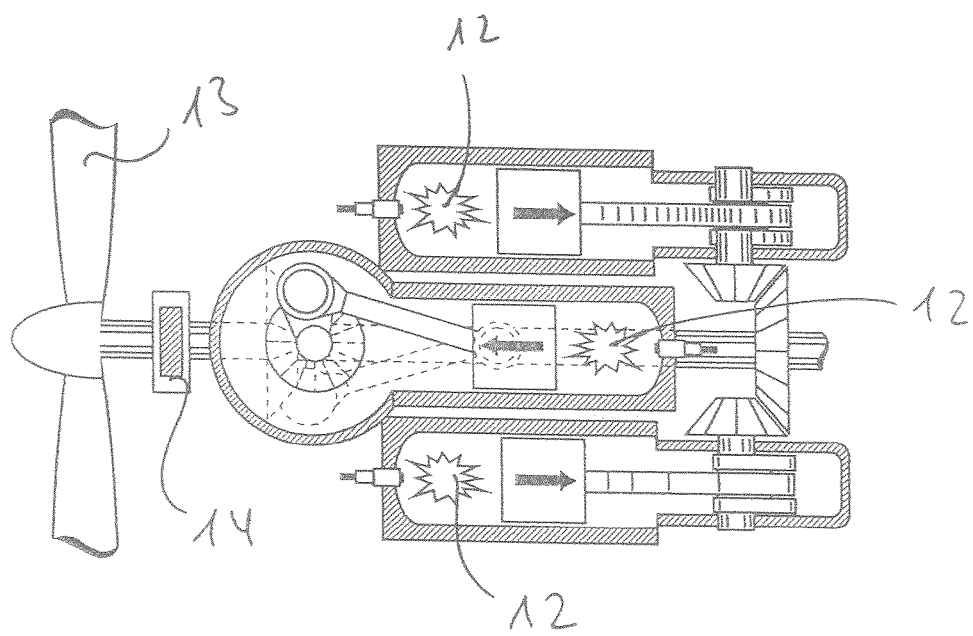

The invention is explained in more detail below with reference to the drawing, in which:

FIG. 1 shows a purely schematic section perpendicularly with respect to the output axial, FIG. 2 shows a purely schematic section, extending repeatedly around the corner, through various cylinder axes, FIGS. 3 and 4 show a variant in the same views as FIGS. 1 and 2, and FIG. 5 shows a variant with two-stroke operation.

FIG. 1 shows in a schematic section, extending through a plurality of stages, through a reciprocating piston engine 1 according to the invention, an output shaft 2 with a bevel gear 3 which is attached thereto and meshes with two drive bevel gears 4. An intermediate gear 5, which meshes with a crank gear 6, is connected in each case to the drive bevel gear 4 in a rotationally fixed and coaxial fashion. The crank gear 6 is in turn permanently connected to a crank(shaft) 7 of a connecting rod 11 of a piston 9 (FIG. 2) of a cylinder 8. As a result of the selection of the transmission ratio of the bevel gears it is possible to arrive within wide limits at suitable transmission ratios, as a result of which the engine can be operated in rotational speed ranges which are favorable for it.

From FIG. 1 it is apparent that the two cylinders 8 whose crankshaft 7 is illustrated are arranged symmetrically with respect to the output shaft 3 and with cylinder axes running parallel thereto. The two crankshafts run parallel to one another, and the output shaft 2 runs perpendicularly with respect to the plane defined by the crank axes.

Two further cylinders 8', which are structurally identical to the cylinders 8 and in which the reference symbols are provided with a " ", for the purposes of differentiation, are provided around the axes of the output shaft 2, rotated by 90° and turned on their head.

As a result of these measures, all four pistons 9 reach the top dead center simultaneously and the bottom dead center simultaneously. However, since two and two cylinders are arranged in opposite directions with respect to one another, as it were head to foot, the differences between the cylinder movement over the crank rotation are completely equalized; as a result of the symmetry of, in each case, two cylinders which are arranged in the same direction, the horizontal forces (actually those which occur perpendicularly with respect to the cylinder axes) are completely equalized.

As is apparent from the arrangement of the pistons and cranks and the arrows specifying the direction of rotation, the engine has complete mass equalization. As a result of the compact design, in which the valves 10' which are assigned to the cylinders 8' can be controlled by the crank 7 of the pistons 9 or of the cylinders 8, the spatial requirement is low and the output shaft 2 which penetrates centrally permits a wide variety of installation situations. As a result of the virtually direct force flux or torque flux from the piston 9 via the connecting rod 11, via the short piston 9 and the toothing to the output shaft 2, the engine is virtually free of twisting and therefore torsional vibrations, which, for example, classic series-mounted six cylinder engines have a tendency to experience because of the length of the crankshaft.

In this variant of the invention it is even more satisfactorily possible, by virtue of the use of the gears 3, 4, 5 and 6, than in the first variant, already to achieve the respectively desired "main rotational speed" of the output shaft 2 in the engine itself at a normal rotational speed of the desired engine without a need for additional components.

One variant of the invention is illustrated in FIGS. 3 and 4, with identical parts being denoted by identical reference symbols to those in FIGS. 1 and 2, and the basic design of the crank drive or of the piston engine is also the same, only the orientation of the crank axes 7' of the individual cylinders is different:

As is apparent in particular from FIG. 3, the axis 7' of the crankshaft 7 runs towards the axis of the output shaft 2 and intersects it. In this way it becomes possible for a drive bevel gear 4 which is seated on the crankshaft 7 to mesh with a bevel gear 3 which is seated on the output shaft 2, and the engine torque is therefore conducted away without intermediate toothing being necessary.

By virtue of this design, it is possible to dispense with the spur gears 5, 6 which are necessary in the first embodiment, and the additional transmission possibility which these gears provide is therefore eliminated and the transmission possibility which is provided by the selection of the bevel gears is retained.

From FIGS. 3 and 4, a variant for driving the valves is apparent, specifically via a toothing which is mounted on the drive shaft 2 in the manner of a thread and which can also be considered to be a worm gear, and spur gears which mesh therewith and which are seated on a shaft with corresponding cams. However, since this variant is to be considered only as an appendix, we have refrained from providing reference symbols.

FIG. 5 shows a variant as a drive for a propeller 13 of an aircraft (not illustrated), wherein, as indicated by the "ignition lighting symbol" 12, two-stroke operation is provided. The illustration runs in turn along a multiply bent surface in order to permit cross sections through the cylinders which are located in a staggered fashion. A damping element 14 is provided in the drive train between the propeller 13 and the engine, said damping element 14 coaxially continuing the drive in the illustrated example, which does not have to be case. This damping means can be combined with a transmission with a suitable transmission ratio. By virtue of the sectional output shaft it is indicated that at least one further engine unit of the same type is provided on the side facing away from the propeller, which engine unit also acts on the output shaft and the propeller 13.

The device according to the invention does not require any new or exotic materials, controls, seals, etc., as a result of which it lies within the inventive knowledge of an engine designer and can be dimensioned and configured without difficulty. The toothing can be configured and manufactured without problems given knowledge of the invention and the power and the torque of the engine and the rotational speed range of the output shaft, and all knowledge which is necessary for this is easily accessible in the field of transmission design.

The illustrations show the output shaft 2 running in an intuitively vertically viewed direction, but this is only a convention. As is customary in the case of reciprocating piston engines, the orientation of the cylinder axes can be adapted to the respective installation situation without this influencing the engine itself. Water cooling and air cooling are conceivable, two-stroke operation or four-stroke operation are conceivable; whether gasoline, diesel or other fuels are used is at the discretion of the designer.

When the invention is applied as an aircraft engine, which is appropriate because of the compact design and the high-quality mass equalization, a "soft" connection or a damping device is indicated in order to protect the bevel gear toothings against shock-like fluctuations in torque which can be induced by the propeller. When the invention is used in this way, the operation as a two-stroke engine is advantageous because the compression pressure is lower, and as a result the wall thicknesses and therefore the mass can be reduced, because no oil troughs are required and the operation is independent of position ("capable of artificial flight"), because no load change takes place at the bevel gear toothing and, finally, because the guidance of the gas streams within a narrow space is more easily possible than in the case of four-stroke operation.

The invention claimed is:

1. A reciprocating piston engine, comprising:
   four cylinders, each cylinder having a circular cross section and a cylinder axis; and
   an output shaft having a shaft axis; wherein each cylinder is coupled to the output shaft via a separate rotating crankshaft and a toothing so that force and torque from each cylinder is transmittable to the output shaft thereby;
   wherein the four cylinders are disposed so as to define the corners of a square and oriented so that each cylinder axis is parallel to an axis orthogonal to the plane of the defined square;
   each cylinder has an axial orientation that matches the axial orientation of its diagonally opposed cylinder and opposes the axial orientation of the two adjacent cylinders; and
   the output shaft is disposed at the center of the defined square with the shaft axis oriented parallel to the cylinder axes.

2. The reciprocating piston engine of claim 1, wherein each cylinder includes a piston configured to have the same phase as the piston of the diagonally opposing cylinder, and each cylinder is coupled to a crankshaft configured to rotate in the opposite direction as the crankshaft coupled to the diagonally opposing cylinder.

3. The reciprocating piston engine of claim 2, wherein the pistons of all four cylinders are configured to reach a top dead center position simultaneously, and to reach a bottom dead center position simultaneously.

4. The reciprocating piston engine of claim 1, wherein each toothing comprises bevel gears.

5. The reciprocating piston engine of claim 1, wherein
   each crankshaft defines a crank axis that intersects the output shaft axis;
   the output shaft further comprises bevel gears disposed on the output shaft; and
   each crankshaft further comprises bevel gears configured to mesh with the bevel gears on the output shaft.

6. The reciprocating piston engine of claim 1, wherein
   each crankshaft defines a crank axis, where the crank axes are oriented parallel to one another in pairs and skewed with respect to the output shaft axis;

the output shaft further comprises bevel gears disposed on the output shaft;

each crankshaft further comprises crankshaft gears that mesh with intermediate coaxial bevel gears that in turn mesh with the bevel gears on the output shaft.

* * * * *